United States Patent [19]
Dumas et al.

[11] Patent Number: 5,356,448
[45] Date of Patent: Oct. 18, 1994

[54] METHOD OF MAKING A PREFORM FOR AN OPTICAL FIBER

[75] Inventors: Jean-Pierre Dumas, Villemoisson sur Orge; Christian Belouet, Sceaux, both of France

[73] Assignee: Alcatel N.V., Amsterdam, Netherlands

[21] Appl. No.: 59,657

[22] Filed: May 12, 1993

[30] Foreign Application Priority Data

May 13, 1992 [FR] France .................. 92 05811

[51] Int. Cl.$^5$ .............. C03C 25/02; C03B 37/023
[52] U.S. Cl. .................. 65/388; 65/DIG. 16; 65/392; 65/412; 65/417; 65/17.4
[58] Field of Search ............ 65/3.11, 3.12, 18.2, 65/DIG. 16

[56] References Cited

U.S. PATENT DOCUMENTS

| | | | |
|---|---|---|---|
| 4,715,875 | 12/1987 | Jacobson | 65/3.11 |
| 4,787,927 | 11/1988 | Mears et al. | 65/3.12 |
| 4,885,019 | 12/1989 | Hutta | 65/3.11 |
| 5,015,281 | 5/1991 | Hall et al. | 65/DIG. 16 |

FOREIGN PATENT DOCUMENTS

| | | |
|---|---|---|
| 0383301 | 8/1990 | European Pat. Off. . |
| 2402270 | 7/1975 | Fed. Rep. of Germany . |
| 3419275 | 11/1985 | Fed. Rep. of Germany . |
| 2174384 | 11/1986 | United Kingdom . |

OTHER PUBLICATIONS

Patent Abstracts of Japan, vol. 9, No. 237 (C–305) Sep. 24, 1985 & JP-A-60 096 537 (Nippon Denki KK) May 30, 1985.

*Primary Examiner*—Robert L. Lindsay
*Attorney, Agent, or Firm*—Sughrue, Mion, Zinn, Macpeak & Seas

[57] ABSTRACT

A method of making a preform for an optical fiber, in which method a plurality of layers of fluoride glass are deposited inside a support tube (10); said layers (14) are deposited by laser ablation in a controlled atmosphere using a target (12) having the composition of said glass, which target is moved back-and-forth parallel to the axis of said tube, the temperature of the enclosure (1) in which said ablation is performed being not greater than the vitreous transition temperature Tg of said glass.

7 Claims, 1 Drawing Sheet

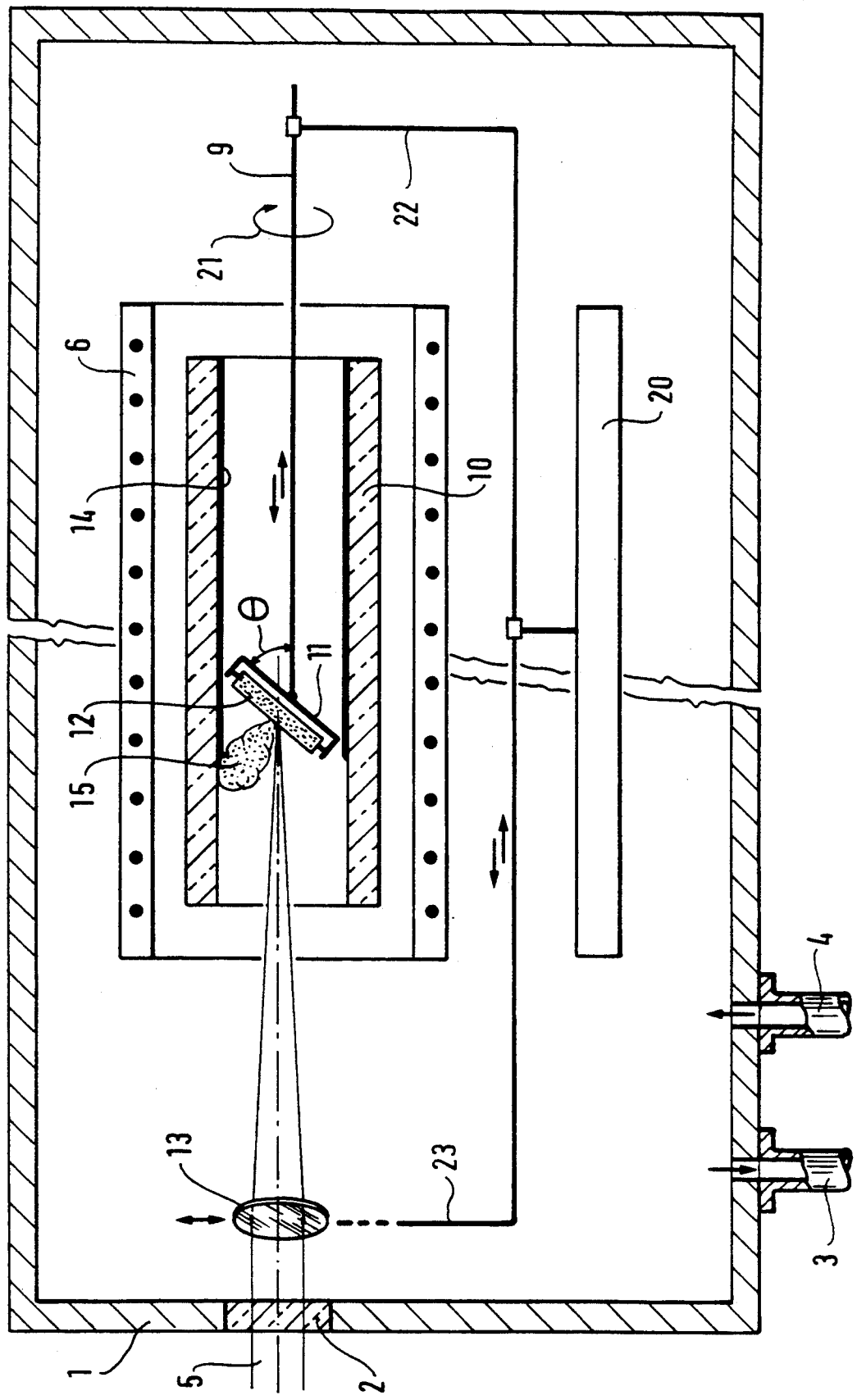

METHOD OF MAKING A PREFORM FOR AN OPTICAL FIBER

BACKGROUND OF THE INVENTION

The present invention relates to a method of making a preform for an ultratransparent or an amplifying optical fiber based on fluoride glass, e.g. of the ZBLAN or BIZYT type, for use in optical telecommunications.

Currently, such fibers have an attenuation rate of 0.65 dB/km over 110 meters for a signal having a wavelength of 1.55 $\mu$m. The aim is to approach the ideal attenuation rate of 0.01 dB/km to 0.02 dB/km over distances of several tens, or even hundreds, of kilometers.

The high attenuation currently measured is attributed, in particular, to extrinsic defects that occur either during the preparation of the starting materials, or else while the glass that is to constitute the core or the cladding of the fiber is being made.

The usual methods of making the glass are based on the technique of a melt in a crucible.

Given the reactive nature of the fluorides used, making the glass in a crucible gives rise to two phenomena having adverse effects:

absorbant and diffusive impurities from the crucible are incorporated in the glass; and heterogeneous nucleation resulting from chemical interaction between the glass and the walls of the crucible is stimulated, with large crystallites (characteristic size of about one micrometer) ultimately being formed in the glass, which crystallites are intense diffusion sources.

Such glass-making "defects" thus result in the optical fiber obtained having an attenuation rate that is very far removed from the ideal limits.

In order to avoid using a melt for manufacturing a preform for an optical fiber made of fluoride glass, consideration has been given to using the sol-gel technique of deposition inside a support tube. That technique is based on using carbon-containing precursors which are organic complexes based on $\beta$-diketones of the metals making up the glass. Reference may be made to the article "sol-gel preparation of amorphous ZBLA heavy metal fluoride powders" by P. J. Melling and M. A. Thomson, J. Mater. Res. vol 5, No. 5 (1990) 1092 and D. R. Ulrich, NATO ASI, Sci, Ser. E123 (1987), 385.

That method does not achieve the desired improvement, in particular because of the problem of completely eliminating the carbon and the oxygen that come from the precursors.

Methods are also known that use chemical vapor deposition (CVD) inside a support tube, which methods also implement the same oxygen-and-carbon-containing precursors with the same difficulties of eliminating the carbon and the oxygen as in the above-mentioned method. The following documents describe such methods:

"Organometallic Chemical Vapor Deposition of ZrF$_4$-based fluoride glasses" K. Fujiura, Y. O kishi, S. Takahashi, Jpn. Appl. Phys. 28-1 (1989); and "Preparation and properties of ZrF$_4$ based fluoride glass films by plasma enhanced Chemical Vapor Deposition", K. Fujiura, Y. Nishida, K. Kobayashi and S. Takahashi, Jpn. J. Appl. phys. 30-8B (1991) L1498.

SUMMARY OF THE INVENTION

An object of the present invention is to make a preform for an optical fiber made of fluoride glass, without using a crucible, and enabling the problem of carbon-containing precursors to be avoided.

The present invention provides a method of making a preform for an optical fiber, in which method a plurality of layers of glass are deposited inside a support tube, said method being characterized by the fact that, with said layers being based on fluoride glass, said layers are deposited by laser ablation in a controlled atmosphere using a target having the composition of said glass, which target is moved back-and-forth parallel to the axis of said tube, the temperature of the enclosure in which said ablation is performed being not greater than the vitreous transition temperature Tg of said glass, and said laser emitting in the ultraviolet range of 200 nanometers to 300 nanometers.

The invention therefore uses a deposition method in which species are physically, rather than chemically, transported from the target. The composition of the plume resulting from the laser irradiation and the composition of the deposited layer are identical to the composition of the target. In such a process, there is no evaporation of chemical species from a melt formed after a laser shot. In order to avoid such a situation, it is preferable to choose the following parameters:

laser energy density greater than 1 joule/cm$^2$; and
laser pulse duration not greater than 30 nanoseconds.

The fact that the laser has a short wavelength enables the laser pulse penetration to be confined to the vicinity of the surface of the target, i.e. to the micrometric scale.

Furthermore, this phenomenon is facilitated by choosing a target of density that is as high as possible, i.e. a relative density of not less than 92%. In this way, the penetration of the beam into the target is limited by using a sintered powder of homogeneous composition made using ground glass whose grain-size is centered around 1 micrometer.

The method of the invention can be implemented to make the core layers of the preform, but it can also be used to make the cladding layers close to the core layers. This makes it possible to avoid defects at the cladding-core interface.

Other characteristics and advantages of the present invention will appear on reading the following description of an embodiment given by way of non-limiting example.

BRIEF DESCRIPTION OF THE DRAWING

The accompanying drawing is a diagram showing how the method of the present invention may be implemented.

DESCRIPTION OF A PREFERRED EMBODIMENT

The operation is performed in an enclosure 1 provided with a transparent window 2 through which a laser beam 5 can be input, vacuum equipment represented by reference 3, and gas inlets 4. It is also necessary to provide equipment for monitoring dust count and moisture content, because the concentration of H$_2$O must be not greater than 1 ppm. Reference 6 designates a tubular furnace inside which a support tube 10 made of fluoride glass is disposed, the tube being made by conventional means. It is assumed that the tube is to be used to form the optical cladding glass of a monomode fiber. Its composition is as follows: $ZrF_4$: 54%; $BaF_2$: 20%; $LaF_3$: 4%; $AlF_3$: 4%; and NaF: 19%.

A target 12 is mounted on a target-holder 11 sloping at an angle Θ relative to the axis 9 of the tube 10.

The target-holder 11 is equipped with mechanical means represented by arrow 21 for rotating it about the axis 9, and mechanical means 20, 22 for moving it in translation along the same axis 9.

A lens 13 or any equivalent means enables the beam 5 to be focussed on the target 12. Mechanical means 20, 23 enable the lens to be moved in translation parallel to the axis 9 and in synchronization with the movement of the target-holder 11. Furthermore, means (not shown) are provided for displacing the impact of the laser beam on the target. In this way, the plume 15 coming from the target 12 sweeps the inside of the tube 10 uniformly.

The window 2 and the lens 13 are, for example, made of UV-quality silica sold under the trademark "SUPRASIL II".

In order to make a layer 14 of fluoride glass of the ZBLAN type to constitute the core of a monomode fiber (after the tube has been collapsed and the fiber has been drawn), the following operations are performed.

The target 12 is a pressed compact Of crystallized materials in power form having the following composition: $ZrF_4$: 54%; $BaF_2$: 23%; $LaF_3$: 4%; $AlF_3$: 3%; and NaF: 16%.

The characteristic size of the grains is of the order of 1 μm. Compression is performed under severe moisture constraints so as to prevent water from being incorporated into the powder; the $H_2O$ concentration must be less than a few ppm in the pressing enclosure. The pressing atmosphere is an inert gas; all necessary precautions are taken to eliminate oxygen as much as possible, because oxygen, like water, is a factor in degrading the performance levels of fluoride glass. The relative density of the target is greater than 92%.

The ablation laser emitting the beam 5 is an excimer laser of the $Xe_2Cl_2$ or $Kr_2F_2$, $Ar_2F_2$ type. Such UV lasers operate at wavelengths of 308 nm, 248 nm, and 193 nm respectively.

It is advantageous to use the 193 nm laser in a low-pressure atmosphere (total pressure <1 torr) containing fluoride species, e.g. $NF_3$ or $SF_6$ so as to ensure that the deposited glass has the desired fluorine concentration.

The operational conditions required are as follows:
wavelength of the laser: $\lambda = 193$ nm;
pulse energy: $>1$ J/cm$^2$;
firing frequency: 1 Hz to 150 Hz;
pulse duration: $\leq 30$ ns;
temperature of the tube 10 below the vitreous transition temperature Tg of the fluoride glass: 270° C.;
inside diameter of the tube 10: 15 mm;
linear speed of the target-holder 11 along the axis 9: 2 mm/minute;
length of the segment which connects the normal at the point of laser impact on the target to the wall of the tube: about 5 cm; and
$NF_3$ pressure: adjustable in the range 0.1 mbars to 0.3 mbars.

Under these conditions, the plume 15 coming from the irradiated target 12 makes it possible to, deposit a layer 14 in the vitreous state that is 2 μm in thickness, and that has a composition identical to that of the target 12. The deposition speed is about $3 \times 10^{-3}$ mm$^3$ per second.

The tube 10 and its layer 14 are then collapsed, thereby forming a preform that can be used directly for the fiber-drawing operation. The difference in refractive index between the core and the cladding is $5 \times 10^{-3}$.

Naturally, the present invention is not limited to the above-described embodiment. Any means may be replaced by equivalent means without going being the ambit of the invention. If an index profile is required in the core fiber, it is possible to deposit successive layers having different compositions and appropriate thicknesses to achieve the desired index profile, as is done elsewhere by using other techniques, e.g. OMCVD. To do this, it is merely necessary to replace the target 12 by a series of targets whose compositions are matched to the desired index values.

The method of the invention applies to glass having very complex compositions which, with active dopants such as Pt, Nd, or passive substituents for adjusting its index, e.g. Pb, Li, in ZBLAN, can contain up to 7 or 8 cations.

What is claimed is:

1. A method of making a preform for an optical fiber, in which method a plurality of layers of glass are deposited inside a support tube, said method being characterized by the fact that, with said layers being based on fluoride glass that is free of any metal oxide, said layers are deposited by laser ablation in a controlled atmosphere using a target having the composition of said glass, which target is moved back-and-forth parallel to the axis of said tube, the temperature of the enclosure in which said ablation is performed being not greater than the vitreous transition temperature Tg of said glass, and said laser emitting in the ultraviolet range of 200 to 300 nanometers.

2. A method according to claim 1, characterized by the facts that said target has a relative density of not less than 92%, and that said target is constituted by said fluoride glass in compacted powder form, with grail-size such that the size of the grains is of the order of 1 μm.

3. A method according to claim 2, characterized by the fact that said laser is an excimer laser of the $Xe_2Cl_2$ or $Kr_2F_2$, $Ar_2F_2$ type.

4. A method according to claim 1, characterized by the fact that said fluoride glass is chosen from ZBLAN glass and BIZYT glass.

5. A method according to claim 3, characterized by the facts that the energy of the laser pulses is greater than 1 joule/cm$^2$, and that the duration of the pulses is not greater than 30 nanoseconds.

6. A method according to claim 5, characterized by the fact that the frequency of said pulses lies in the range 1 Hz to 150 Hz.

7. A method according to claim 1, characterized by the fact that said controlled atmosphere includes a gaseous fluoride chosen from $NF_3$ and $SF_6$, and whose pressure is adjustable in the range 0.1 mbars to 0.3 mbars.

* * * * *